(12) United States Patent
Anderson et al.

(10) Patent No.: US 9,260,301 B2
(45) Date of Patent: Feb. 16, 2016

(54) INTEGRATED DRYING GASIFICATION

(75) Inventors: Bernard Anderson, Victoria (AU); Alex Blatchford, Victoria (AU); Tom Stephanou, Victoria (AU)

(73) Assignee: HRL TREASURY (IDGCC) PTY LTD (AU)

( * ) Notice: Subject to any disclaimer, the term of this patent is extended or adjusted under 35 U.S.C. 154(b) by 0 days.

(21) Appl. No.: 14/117,211

(22) PCT Filed: May 9, 2012

(86) PCT No.: PCT/AU2012/000497
§ 371 (c)(1),
(2), (4) Date: Nov. 12, 2013

(87) PCT Pub. No.: WO2012/151625
PCT Pub. Date: Nov. 15, 2012

(65) Prior Publication Data
US 2014/0151603 A1 Jun. 5, 2014

(30) Foreign Application Priority Data
May 9, 2011 (AU) ................................ 2011901738

(51) Int. Cl.
*C01B 3/02* (2006.01)
*B01J 6/00* (2006.01)
(Continued)

(52) U.S. Cl.
CPC . *C01B 3/02* (2013.01); *B01J 6/008* (2013.01); *C10J 3/482* (2013.01); *C10J 3/503* (2013.01); *C10J 3/56* (2013.01); *C10K 1/024* (2013.01); *C10J 2200/152* (2013.01); *C10J 2200/156* (2013.01); *C10J 2300/093* (2013.01); *C10J 2300/0909* (2013.01);
(Continued)

(58) Field of Classification Search
CPC combination set(s) only.
See application file for complete search history.

(56) References Cited

U.S. PATENT DOCUMENTS 3,985,519 A 10/1976 Kalina et al.
4,168,956 A 9/1979 Blaskowski
(Continued)

FOREIGN PATENT DOCUMENTS

CA 2755353 A1 10/2010
CN 2740609 Y 11/2005
(Continued)

OTHER PUBLICATIONS

International Preliminary Report on Patentability for corresponding application PCT/AU2012/000497 filed May 9, 2012; Report date Aug. 6, 2013.
(Continued)

*Primary Examiner* — Kaity Handal
(74) *Attorney, Agent, or Firm* — Cantor Colburn LLP

(57) ABSTRACT

An integrated drying gasification system comprises a gasifier for gasifying carbonaceous fuel to produce hot product gas and an entrained flow dryer which receives the hot product gas to dry the carbonaceous fuel prior to gasification. At least one inlet to the gasifier communicates one or more additional gases from the system, such as recycled syngas, steam and/or recycled carbon dioxide, to the gasifier to generate an increased hot product gas mass flow rate from the gasifier. The system may comprise a plurality of lock hopper systems coupled to the entrained flow dryer. At least one intermediate storage vessel may be provided in one or more feed legs to the gasifier maintain a constant supply of carbonaceous fuel to the gasifier for a temporary period independently of carbonaceous fuel supplied to the entrained flow dryer.

21 Claims, 6 Drawing Sheets

(51) Int. Cl.
*C10J 3/48* (2006.01)
*C10J 3/56* (2006.01)
*C10K 1/02* (2006.01)
*C10J 3/50* (2006.01)
*C10K 1/00* (2006.01)
*C10K 1/10* (2006.01)
*C10K 1/12* (2006.01)
*C10K 3/04* (2006.01)

(52) U.S. Cl.
CPC .  *C10J 2300/0916* (2013.01); *C10J 2300/0959* (2013.01); *C10J 2300/0969* (2013.01); *C10J 2300/0976* (2013.01); *C10J 2300/1815* (2013.01); *C10J 2300/1823* (2013.01); *C10K 1/003* (2013.01); *C10K 1/101* (2013.01); *C10K 1/121* (2013.01); *C10K 3/04* (2013.01); *Y02E 20/18* (2013.01)

(56) References Cited

U.S. PATENT DOCUMENTS

| | | | |
|---|---|---|---|
| 4,337,066 A | | 6/1982 | Kunii |
| 4,432,773 A | | 2/1984 | Euker, Jr. et al. |
| 4,689,949 A | | 9/1987 | Kashiwazaki et al. |
| 4,773,917 A | * | 9/1988 | Morihara et al. ........... 48/77 |
| 4,859,213 A | * | 8/1989 | Segerstrom ................. 48/87 |
| 5,695,532 A | | 12/1997 | Johnson et al. |
| 5,755,838 A | * | 5/1998 | Tanaka et al. ............... 48/77 |
| 5,953,899 A | * | 9/1999 | Rao et al. .................. 60/781 |
| 6,141,796 A | | 11/2000 | Cummings |
| 6,148,599 A | | 11/2000 | McIntosh et al. |
| 2005/0081766 A1 | * | 4/2005 | McIntosh ................. 110/286 |
| 2009/0120285 A1 | * | 5/2009 | Thacker et al. ............. 95/19 |
| 2010/0011664 A1 | * | 1/2010 | Ariyapadi et al. ........ 48/128 |
| 2010/0115841 A1 | | 5/2010 | Cork |
| 2010/0251613 A1 | | 10/2010 | Thacker et al. |
| 2011/0139047 A1 | | 6/2011 | Takase et al. |
| 2011/0308230 A1 | * | 12/2011 | Takase et al. ............ 60/39.182 |
| 2013/0019529 A1 | * | 1/2013 | Song et al. ................ 48/111 |
| 2013/0026419 A1 | * | 1/2013 | Song et al. ............... 252/373 |

FOREIGN PATENT DOCUMENTS

| | | |
|---|---|---|
| CN | 101636473 A | 1/2010 |
| EP | 0102828 A2 | 3/1984 |
| EP | 0634471 A1 | 1/1995 |
| PL | 164897 B3 | 12/1991 |
| WO | 9323500 A1 | 11/1993 |

OTHER PUBLICATIONS

International Search Report for corresponding application PCT/AU2012/000497 filed May 9, 2012; Mail date Aug. 7, 2012.
Chinese Office Action for Chinese Application No. 201280022765.4, Office Action Issue Date Nov. 3, 2014, 6 pages, English Text of First Office Action.
Chinese Office Action for Chinese Application No. 201280022765.4, Office Action Issue Date Nov. 3, 2014, 6 pages, non-translated.
Partial Supplementary European Search Report for European Application No. 12782353.2; Date of Issuance Nov. 18, 2014; 6 pages.
Canada Office Action for Canadian Patent Application No. 2,835,142, OA transmission date Jun. 18, 2015, 5 pages.

* cited by examiner

INTEGRATED DRYING GASIFICATION

FIELD OF THE INVENTION

The present invention relates to improvements in integrated drying gasification. In particular, but not exclusively, some embodiments of the present invention relate to improved integrated drying using oxygen or air blown gasification of high moisture content carbonaceous fuels, such as coals or lignite. Some embodiments of the present invention relate to improved gasification systems comprising fluid bed gasifiers or other types of gasification plant.

BACKGROUND OF THE INVENTION

The gasification of carbonaceous fuels, such as coals or lignite, can be used to produce a range of saleable products, such as diesel, naphtha, hydrogen and/or urea, to name but a few. In some applications, oxygen blown gasification can be preferred to air blown gasification to achieve the desired syngas (synthetic/synthesis gas) quality, to reduce the size of the equipment and to increase the performance of the downstream processing equipment.

In Integrated Drying Gasification (IDG), hot gases exiting the fluid bed gasification vessel (gasifier) at between about 750° C. and 1,050° C. are supplied to an entrained flow dryer along with partially dried coal. The dryer cools the gas down to about 200° C. to 280° C. by drying the coal. To achieve high efficiency, the moisture content of the dried coal feed to the gasifier needs to be as low as possible, preferably within the range of about 5-10%. Achieving the level of drying required for a given moisture content coal supplied to the dryer requires a set thermal energy in the gasifier off-gases. The thermal energy in the off-gases is set by the gas flow rate, the gas composition and the gas temperature. However, the use of oxygen blown gasification alters the gas composition and reduces the flow rate of the gasifier off-gases by about half compared with air blown gasification, therefore also reducing the capacity of the integrated dryer by about half. There is a desire to use the preferred oxygen blown gasification whilst addressing the drawback of reduced drying capacity.

In IDG processes, it is known to use of one or more pressurised drying vessels per gasifier, as disclosed in International Patent Publication No. WO 93/23500. To increase the pressure of the carbonaceous fuel, in particular coal, to allow it to be fed into the entrained flow dryer, a lock hopper system or train is used. Each lock hopper train consists of an atmospheric pressure hopper, a second lock hopper which cycles between atmospheric and process pressure and a third hopper which is always at process pressure. Due to size limitations on the pressure vessels, to achieve the required coal feed rate for commercial scale plant, multiple lock hopper trains are required. Known designs of the entrained flow dryer incorporate a single lock hopper train for each dryer. Therefore, the requirement for multiple lock hopper trains leads to the requirement for multiple dryers, thus adding to the complexity and cost of the process. There is a desire to minimise or avoid such added complexity and cost.

Another problem with IDG processes is that any disruption of the feed of carbonaceous fuel, such as coal, to the entrained flow dryer can negatively affect gas production in the gasifier and/or the control of key process parameters, such as fluid bed temperature. These issues can disrupt downstream processes, such as the production of saleable products or power generation. There is a desire to minimise or avoid such disruptions.

Reference to any prior art in this specification is not, and should not be taken as, an acknowledgement or any form of suggestion that the prior art forms part of the common general knowledge in Australia or any other country.

Throughout this specification and claims which follow, unless the context requires otherwise, the word "comprise", and variations such as "comprises" and "comprising", will be understood to imply the inclusion of a stated integer or step or group of integers or steps, but not the exclusion of any other integer or step or group of integers or steps.

OBJECT OF THE INVENTION

It is a preferred object of the present invention to provide an improved apparatus and/or system and/or method for integrated drying gasification that addresses or at least ameliorates one or more of the aforementioned problems or at least provides a useful commercial alternative.

SUMMARY OF THE INVENTION

Generally, aspects of the present invention relate to improved integrated drying gasification systems and methods in which at least a portion of one or more gases in the system, such as recycled syngas, steam and/or recycled carbon dioxide, are input to a gasifier of the system to generate ah increased gas mass flow rate from the gasifier. The increased gas mass flow exiting the gasifier allows higher moisture content carbonaceous fuels to be supplied to the integrated dryer, thus reducing the external drying required and increasing the overall performance of the system.

According to one aspect, but not necessarily the broadest aspect, the present invention resides in an integrated drying gasification system comprising:

a gasifier for gasifying carbonaceous fuel to produce hot product gas;

an entrained flow dryer which receives the hot product gas to dry the carbonaceous fuel prior to gasification; and at least one inlet to the gasifier to communicate one or more additional gases from the system to the gasifier to generate an increased hot product gas mass flow rate from the gasifier.

Preferably, the additional gas is recycled syngas. Alternatively, or additionally, the additional gas can be steam and/or recycled carbon dioxide.

Suitably, the syngas is recycled downstream of one or more filters of the system such that the syngas is free, or substantially free, of particulates.

Suitably, the syngas is recycled downstream of one or more syngas coolers of the system to reduce the temperature of the recycled syngas.

Suitably, the syngas is recycled downstream of an ammonia scrubber of the system.

Suitably, the syngas is recycled downstream of one or more of the following of the system: a main filter; a water gas shift vessel; an acid gas removal system; a membrane separation system; a pressure swing adsorption system; or other syngas processing equipment.

Suitably, the system comprises a compressor to increase the pressure of the one or more recycled gases prior to communicating the recycled gases to the gasifier.

Where the gasifier is a fluid bed gasifier, the one or more additional gases can be supplied to a fluid bed and/or a freeboard region of the fluid bed gasifier.

Preferably, the one or more additional gases can be supplied to the gasifier via a plurality of nozzles at a variety of levels of the gasifier.

Preferably, recycled syngas, steam and/or recycled carbon dioxide is supplied to the gasifier via respective separate nozzles, which are also separate from nozzles that supply oxygen to the gasifier.

Suitably, steam and/or recycled carbon dioxide is mixed with oxygen prior to supply to the gasifier.

According to another aspect, but not necessarily the broadest aspect, the present invention resides in a method of improving the performance of an integrated drying gasification system, the method including adding one or more gases from the system to a gasifier of the system to generate an increased hot product gas mass flow rate from the gasifier.

Preferably, the additional gas is recycled syngas. Alternatively, or additionally, the additional gas can be steam and/or recycled carbon dioxide.

The method can include increasing the pressure of the one or more recycled gases prior to communicating the recycled one or more gases to the gasifier.

Generally, other aspects of the present invention relate to improved integrated drying gasification systems and methods in which a plurality of lock hopper systems are coupled to a single entrained flow dryer of the gasification system.

According to a further aspect, but not necessarily the broadest aspect, the present invention resides in an improved integrated drying gasification system comprising:

a gasifier for gasifying carbonaceous fuel to produce hot product gas;

a single entrained flow dryer which receives the hot product gas to dry the carbonaceous fuel prior to gasification; and a plurality of lock hopper systems coupled to the single entrained flow dryer to supply pressurized, pre-dried carbonaceous fuel to the single entrained flow dryer.

Preferably, the system comprises a respective feed point to the entrained flow dryer for each lock hopper system.

Preferably, the respective feed points are provided around a circumference of the entrained flow dryer.

Suitably, the respective feed points are provided at the same level, or at different levels, of the entrained flow dryer.

Generally, further aspects of the present invention relate to improved integrated drying gasification systems and methods in which an intermediate storage vessel is provided in a feed leg to a gasifier of the system to maintain a constant supply of carbonaceous fuel to the gasifier for a temporary period independently of carbonaceous fuel supplied to an entrained flow dryer of the system.

According to a yet further aspect, but not necessarily the broadest aspect, the present invention resides in an improved integrated drying gasification system comprising:

a gasifier for gasifying carbonaceous fuel to produce hot product gas;

a feed leg coupled to the gasifier to supply carbonaceous fuel to the gasifier; and at least one intermediate storage vessel provided in the feed leg to maintain a constant supply of carbonaceous fuel to the gasifier for a temporary period independently of carbonaceous fuel supplied to an entrained flow dryer of the system.

Suitably, the intermediate storage vessel can provide a supply of carbonaceous fuel to the gasifier for a period of between about 10 and about 20 minutes.

Suitably, any of the aforementioned gasification systems can comprise a plurality of feed legs coupled to the gasifier for delivering carbonaceous fuel to the gasifier.

Suitably, three feed legs are arranged around the circumference of the gasifier at regular intervals, such as at intervals of 90 degrees.

Alternatively, the feed legs can be arranged at other angles around part of the circumference of the gasifier.

Suitably, the feed legs can be coupled to the gasifier at the same level, or at different levels.

It will be appreciated that one or more of the aforementioned aspects of the present invention can be incorporated in a single integrated drying gasification system.

Further aspects and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein.

Figure 1:
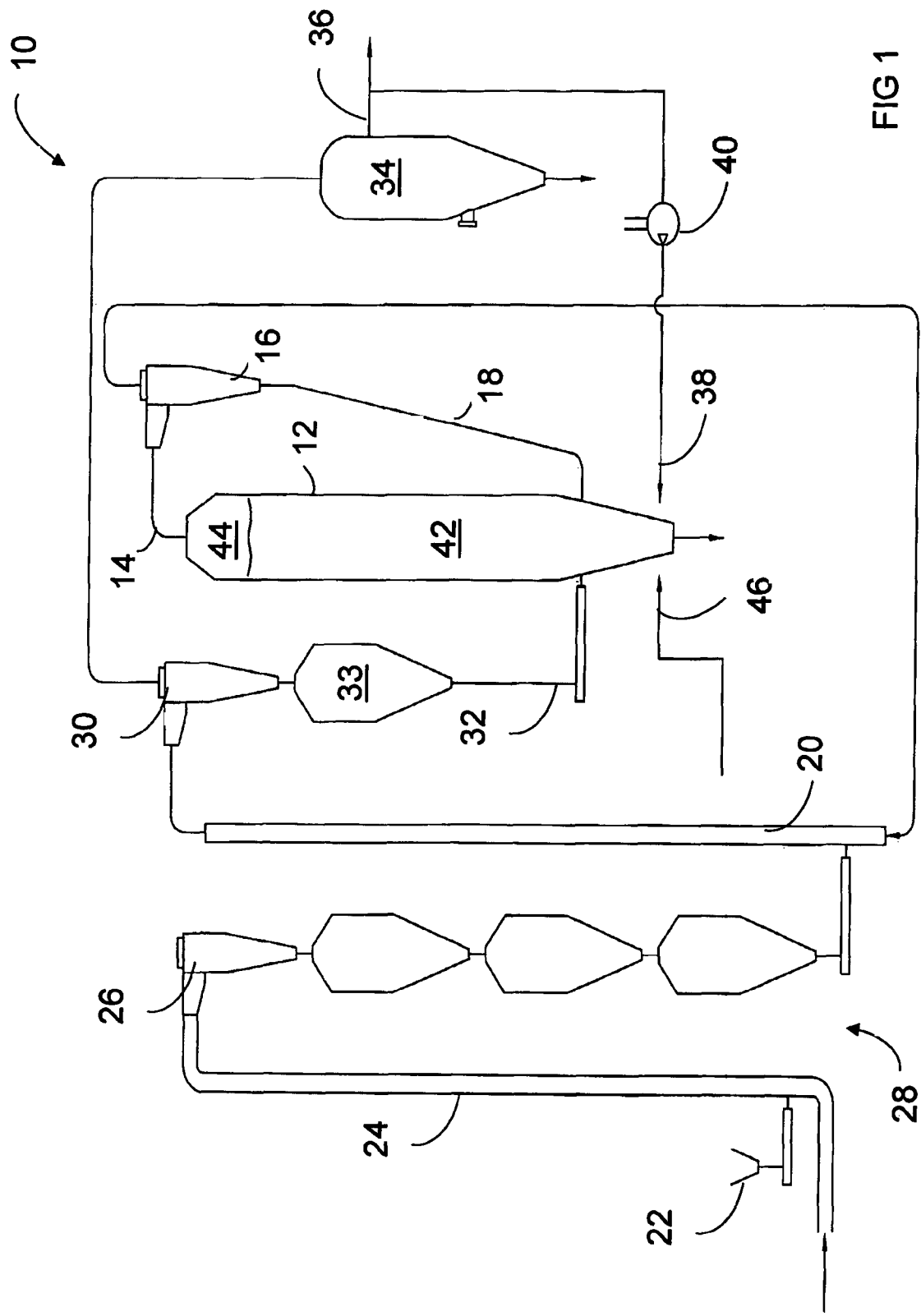
FIG. 1 is a schematic representation of an integrated drying gasification system according to embodiments of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE PREFERRED EMBODIMENTS

Some embodiments of the present invention are directed to improved integrated drying gasification systems and methods in which at least a portion of one or more gases in the system, such as syngas, steam and/or carbon dioxide, are input to a gasifier of the system to generate an increased gas mass flow rate from the gasifier, which increases the drying capacity of the hot product gases from the gasifier.

As will be described herein, the selection of the source of the additional gas or gases depends upon the required gas composition for processing downstream of a main filter of the system, as well as energy efficiency, heat integration and the effect on gasification performance.

With reference to FIG. 1, an integrated drying gasification system 10 comprises a gasifier 12 for gasifying carbonaceous fuel, such as, but not limited to, coals, lignite, peat, wood waste, biomass, bagasse, sewage etc., to produce hot product gas 14. The hot product gas 14 passes through a cyclone 16 to, remove particulates from the hot product gas. The extracted particulates are fed back into the gasifier 12 via conduit 18. The hot product gas 14 from which the particulates have been extracted is supplied to an entrained flow dryer 20. The dryer 20 receives the hot product gas to dry the carbonaceous fuel prior to gasification.

The carbonaceous fuel is supplied from a hopper 22 to a steam line 24 of a pre-dryer where it is typically mixed with superheated steam around 300 to 450° C. The steam line 24 communicates the carbonaceous fuel and steam mixture to a cyclone 26 which separates the steam from the carbonaceous fuel. The pre-dried carbonaceous fuel is then fed from the cyclone 26 to one or more lock hopper systems 28 to be pressurized for delivery to the entrained flow dryer 20. The lock hopper system 28 will be described in more detail below in relation to other embodiments and aspects of the invention.

The carbonaceous fuel that has been dried in the entrained flow dryer 20 by the hot product gas 14 is separated from the cooled product gas in cyclone 30. The dried carbonaceous fuel is fed into the gasifier 12 via feed leg 32. In the embodiment shown in FIG. 1, feed leg 32 comprises one or more intermediate storage vessels 33 between the cyclone 30 and the gasifier 12 according to another aspect of the invention, which will be described in further detail below.

The cooled product gas from the cyclone 30 is communicated to a filter 34 which removes particulates from the cooled gas to produce cleaned gas, typically referred to as syngas (synthetic/synthesis gas) 36. The syngas 36 is then used to produce a range of saleable products, such as diesel, naphtha, hydrogen and/or urea, to name but a few, and/or the syngas 36 is used for power generation.

In accordance with embodiments of the present invention, system 10 comprises at least one inlet 38 to the gasifier 12 to communicate one or more additional gases from the system to the gasifier 12 to generate an increased hot product gas mass flow rate from the gasifier 12. The increased gas mass flow exiting the gasifier 12 allows higher moisture content carbonaceous fuels to be supplied to the integrated dryer 20, thus reducing the external drying required and increasing the overall performance of the integrated drying gasification system 10. Also, fuel with higher moisture content that previously could not have been used with prior art gasification systems can now be used with embodiments of the present invention.

In the embodiment shown in FIG. 1, one of the additional gases is recycled syngas, which can be sourced from a number of locations. In some embodiments, the syngas is sourced downstream of one or more filters of the system 10, such as downstream of filter 34 comprising candle filters such that the syngas is free, or substantially free of particulates.

In some embodiments, the syngas can be recycled immediately downstream of the main filter 34. However, at this point the syngas will be the hottest and will have a high moisture content. Therefore, in some embodiments, the syngas is recycled downstream of one or more syngas coolers (not shown) of the system 10 to reduce the temperature and moisture content of the recycled syngas. In some embodiments, the syngas is recycled downstream of an ammonia scrubber (not shown) of the system 10 to reduce the ammonia and moisture content of the recycled syngas. Recycling of the syngas downstream of the coolers or the ammonia scrubber may or may not include the removal of water. In other embodiments, the syngas is recycled downstream of a water gas shift vessel of the system. Alternatively, the syngas is recycled downstream of an acid gas removal system, a membrane separation system, a pressure swing adsorption system or other syngas processing equipment of the system.

The system comprises one or more compressors 40 to increase the pressure of the one or more recycled gases prior to communicating the recycled gases to the gasifier. FIG. 1 shows a compressor 40 for the recycled syngas 36.

According to some embodiments, the additional gas is steam. The use of a steam supply to the gasifier 12 has the benefit of increasing the char reaction rate, as well as optimising the water to carbon monoxide ratio in the product gas supplied to the shift reactor. Steam is also preferred if there is an excess of steam available in the overall process.

According to some embodiments, the additional gas added to the gasifier 12 is recycled carbon dioxide. For applications where carbon dioxide is being captured, a portion of the carbon dioxide can be recycled back to the gasifier 12. Carbon dioxide is one of the main gasification agents and can be used to increase char reaction rates.

According to some embodiments, the additional gases communicated to the gasifier 12 include syngas and steam or syngas and carbon dioxide or steam and carbon dioxide or syngas, steam and carbon dioxide.

In gasification systems which utilize a fluid bed gasifier, the supply of the additional gas or gases to the gasifier 12 has the additional benefit of increasing the level of fluidisation and mixing within a fluid bed 42, as well as assisting the control of peak temperatures in the gasifier 12.

The one or more additional gases can be supplied to the fluid bed 42 and/or to a freeboard region 44 of the gasifier 12. However, FIG. 1 only shows the supply of additional gas in the form of recycled syngas to the fluid bed 42 via inlet 38. Inlet 46 represents the supply of oxygen to the gasifier 12.

The additional gas can be supplied to the gasifier 12 by a number of means, depending upon which gas supply is used. Gas is generally supplied to the gasifier 12 off supply ring main(s) to a number of nozzles at different set level(s) or height(s) in the gasifier.

Figure 2:
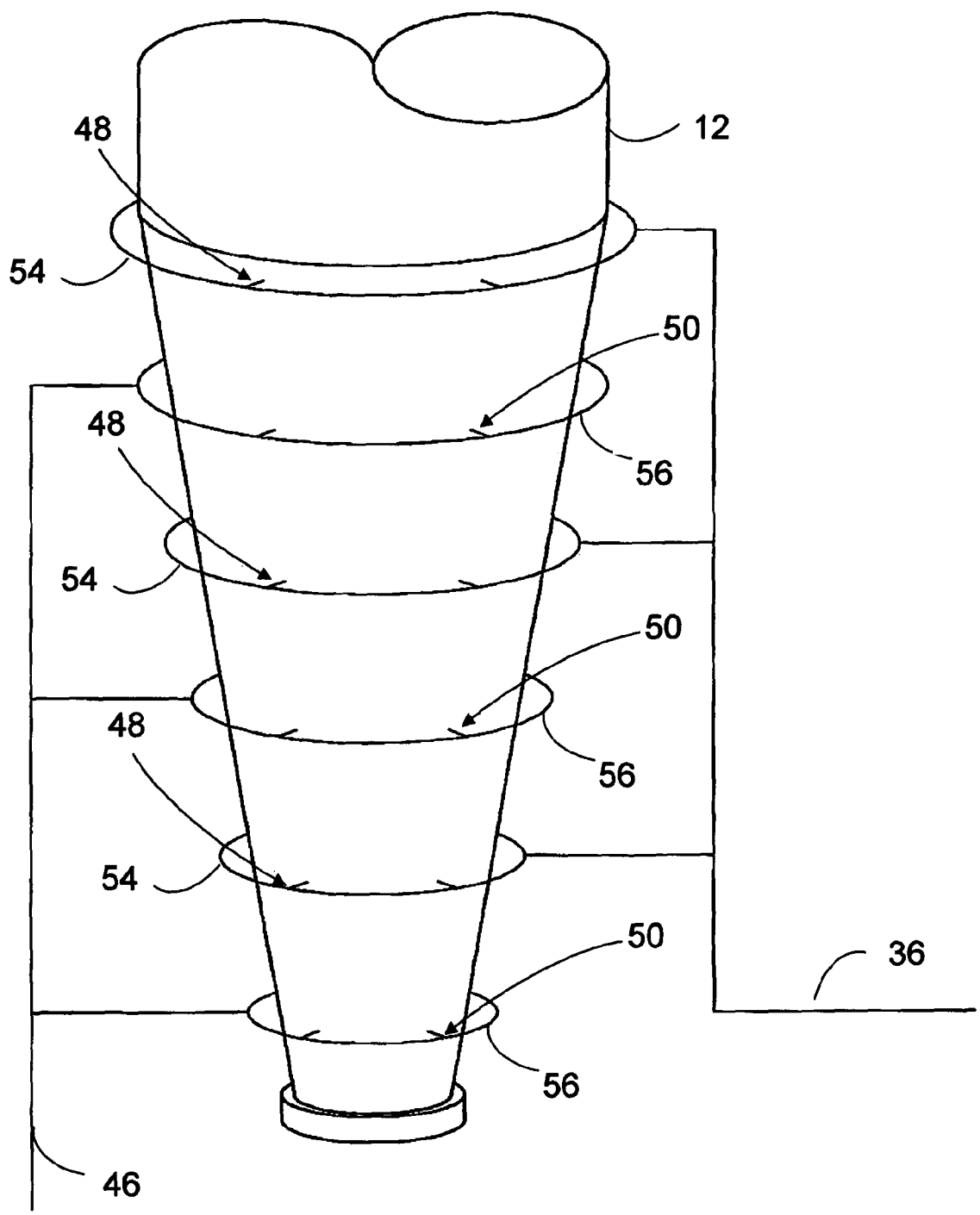
FIG. 2 is a schematic representation of a nozzle arrangement for the injection of one or more recycled gases and oxygen into the gasifier shown in FIG. 1.
Figure 3:
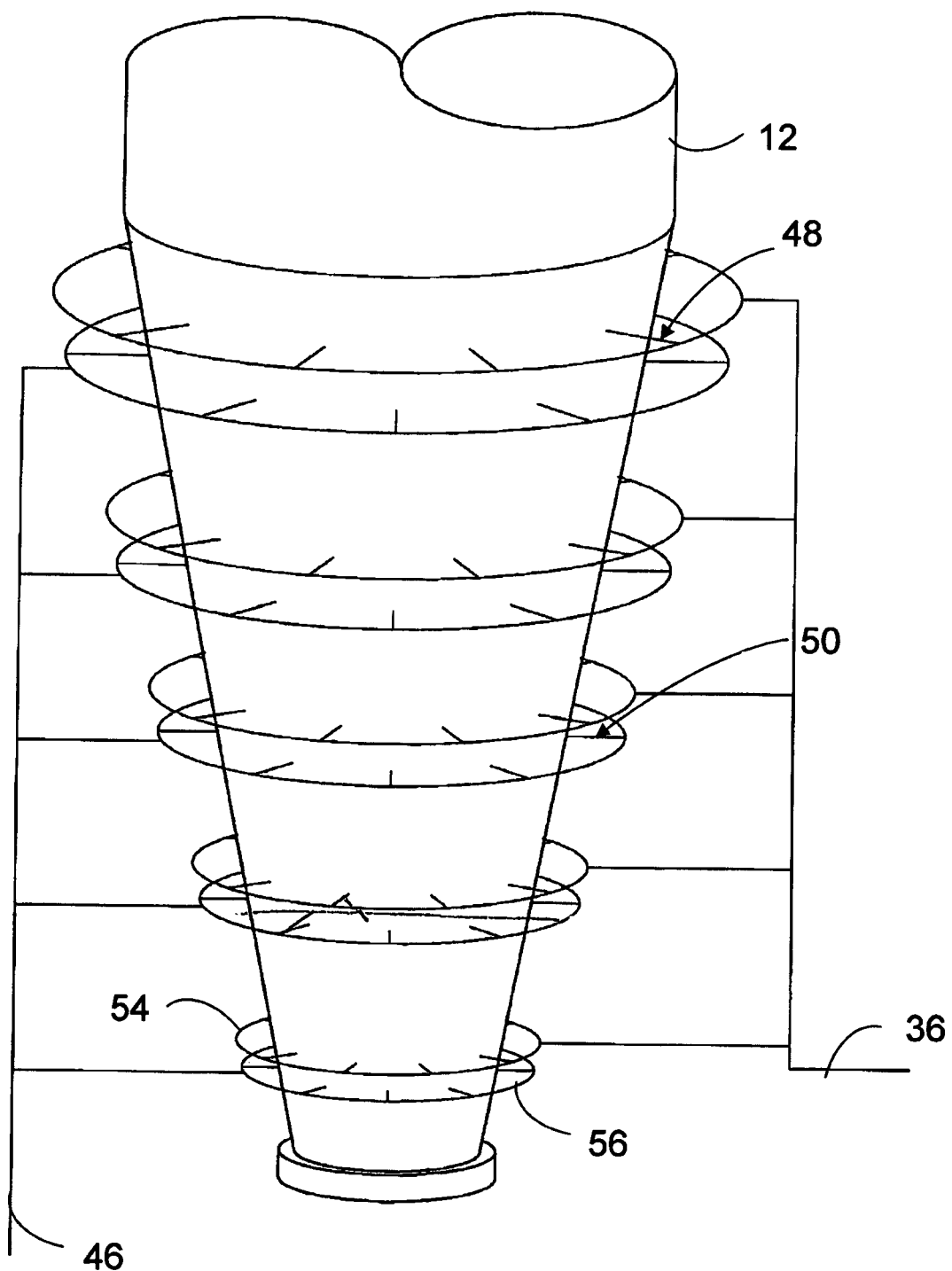
FIGS. 3 and 4 are schematic representations of alternative nozzle arrangements.
Figure 4:
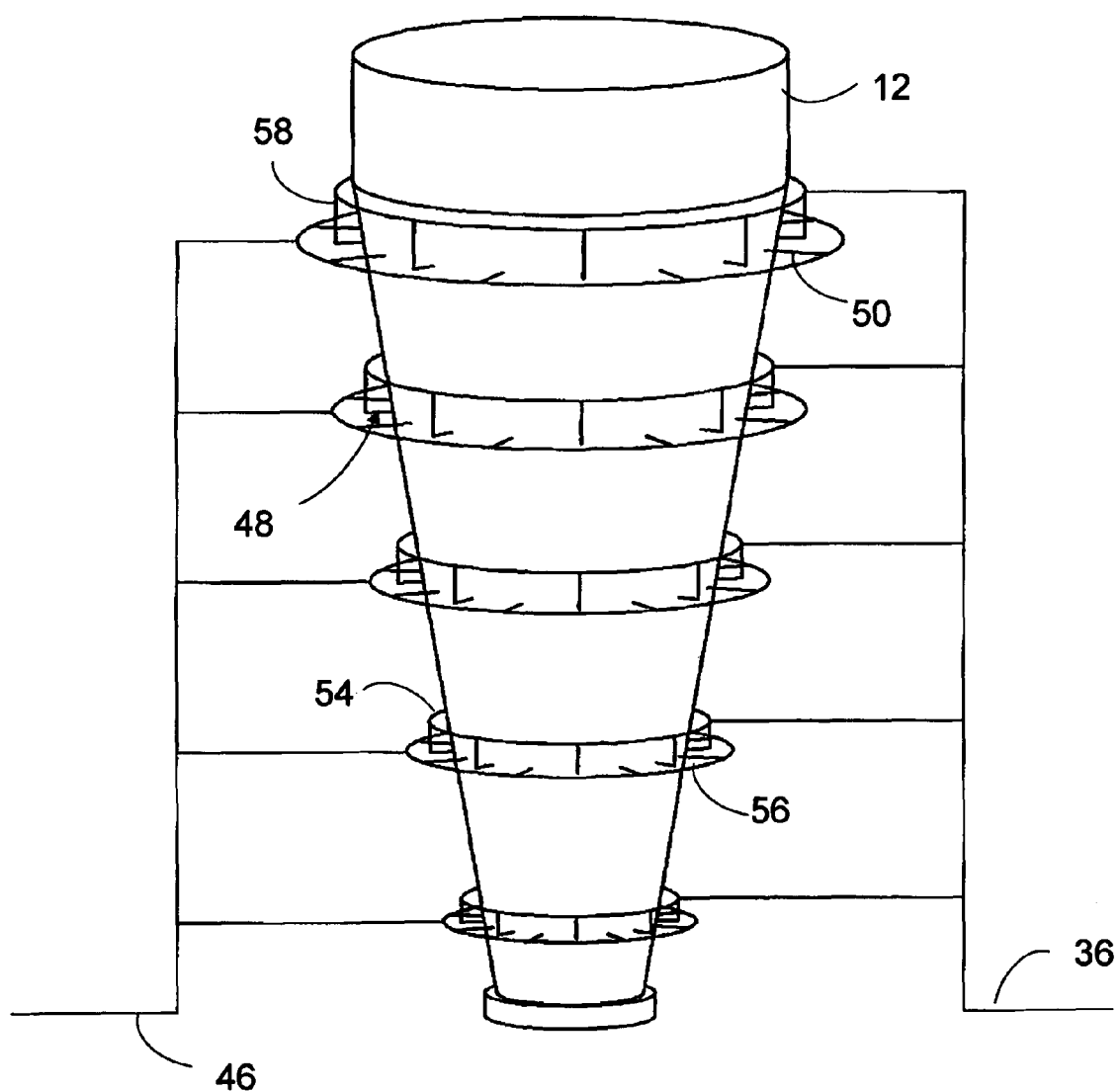

With reference to FIGS. 2, 3 and 4, the one or more additional gases can be supplied to the gasifier 12 via a plurality of nozzles 48 connected to the gasifier 12 at a variety of levels of the gasifier 12 in accordance with embodiments of the present invention.

For embodiments in which the additional gas is, or includes, recycled syngas, as syngas is combustible with oxygen, the nozzles 48 supplying recycled syngas 36 into the gasifier 12 need to be kept separate from the oxygen flow to maximise the oxidant reaction with char and reduce peak temperatures in the gasifier 12. Hence, in some embodiments, recycled syngas is supplied to the gasifier 12 via nozzles 48 connected to the syngas supply line, which are separate from nozzles 50 that supply oxygen to the gasifier 12. As shown in FIG. 2, alternate syngas/oxygen supply levels can be provided to minimise the number of ring mains. Separate rings 54 comprising respective nozzles 48 are provided for the recycled syngas supply at alternate levels and separate rings 56 comprising respective nozzles 50 are provided for the oxygen supply at alternate levels. Steam and/or recycled carbon dioxide can be provided in a similar manner.

With reference to the embodiment shown in FIG. 3, separate rings 54 comprising respective nozzles 48 for recycled syngas supply and separate rings 56 comprising respective nozzles 50 for oxygen supply are provided at each level. In this embodiment, rings 54 and 56 and their respective nozzles 48 and 50 at each level are vertically spaced apart by a relatively small distance compared with the vertical separation between adjacent levels.

In the embodiment shown in FIG. 4, ring 54 for supplying the recycled gas and ring 56 for supplying oxygen are vertically spaced apart by a relatively small distance. However, in this embodiment, ring 54 includes downwardly depending tubes or conduits 58 from which nozzles 48 extend for connection with the gasifier 12 such that the recycled gas is injected into the gasifier at the same level as the oxygen. Nozzles 48 for injecting the recycled gas and nozzles 50 for injecting the oxygen alternate around the circumference of the gasifier 12 at each level.

Steam and carbon dioxide are not combustible with oxygen. Therefore, steam and/or recycled carbon dioxide can be pre-mixed with oxygen upstream of the ring main prior to supply to the gasifier 12. In some embodiments, steam and/or carbon dioxide can be supplied as an annulus to prevent hot spots near the nozzles and the wall of the gasifier 12.

According to another aspect of the present invention a method of improving the performance of an integrated drying gasification system 10 is provided. The method includes adding one or more gases, such as recycled syngas, steam and/or recycled carbon dioxide, from the system 10 and communicating the one or more additional gases to the gasifier 12 to generate an increased hot product gas mass flow rate from the gasifier 12. The method can include increasing the pressure of the one or more additional gases prior to communicating the additional gases to the gasifier.

Reference is now made to the aforementioned problems of increased costs and complexity of the IDG process due to multiple integrated dryers per gasifier (for oxygen or air blown gasification) because of the requirement for multiple lock hoppers to achieve the required feed rate of carbonaceous fuel in commercial scale plant. In accordance with other aspects of the present invention, the number of integrated dryers can be reduced to just one through the development of multiple feed systems into one entrained flow dryer.

Figure 5:
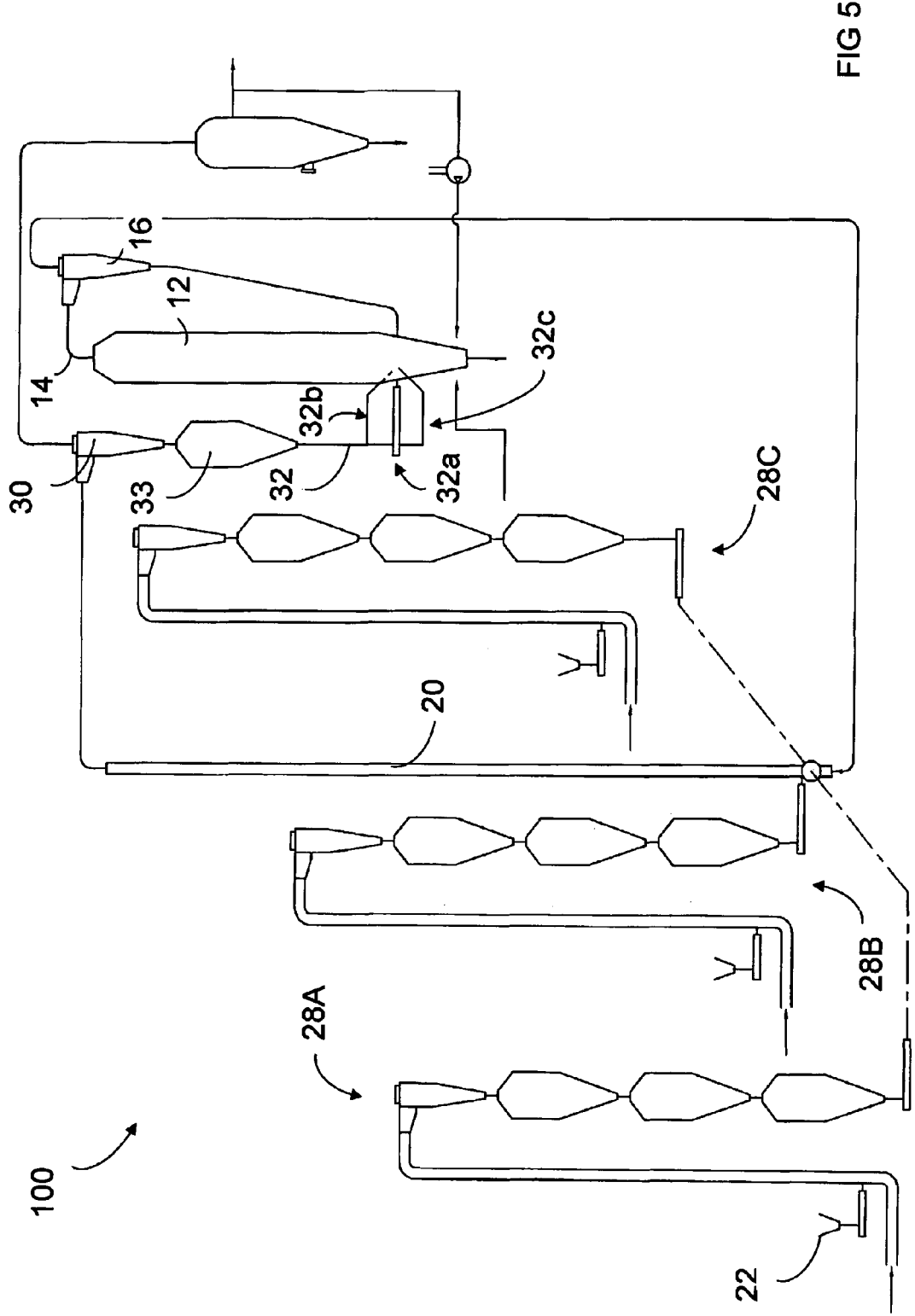
FIG. 5 is a schematic representation of an integrated drying gasification system according to further embodiments of the present invention.

With reference to FIG. 5, an improved integrated drying gasification system 100 is provided comprising a similar arrangement to that described above in relation to FIG. 1. Hence, the system 100 comprises a gasifier 12 for gasifying carbonaceous fuel to produce hot product gas 14. System 100 also comprises a single entrained flow dryer 20 which receives the hot product gas 14 to dry the carbonaceous fuel prior to gasification. However, in this embodiment, system 100 comprises a plurality of lock hopper systems 28 coupled to the single entrained flow dryer 20 to supply pressurized, pre-dried carbonaceous fuel to the single entrained flow dryer. In the example shown in FIG. 5, system 100 comprises three lock hopper systems 28A, 28B and 28C.

Figure 6:
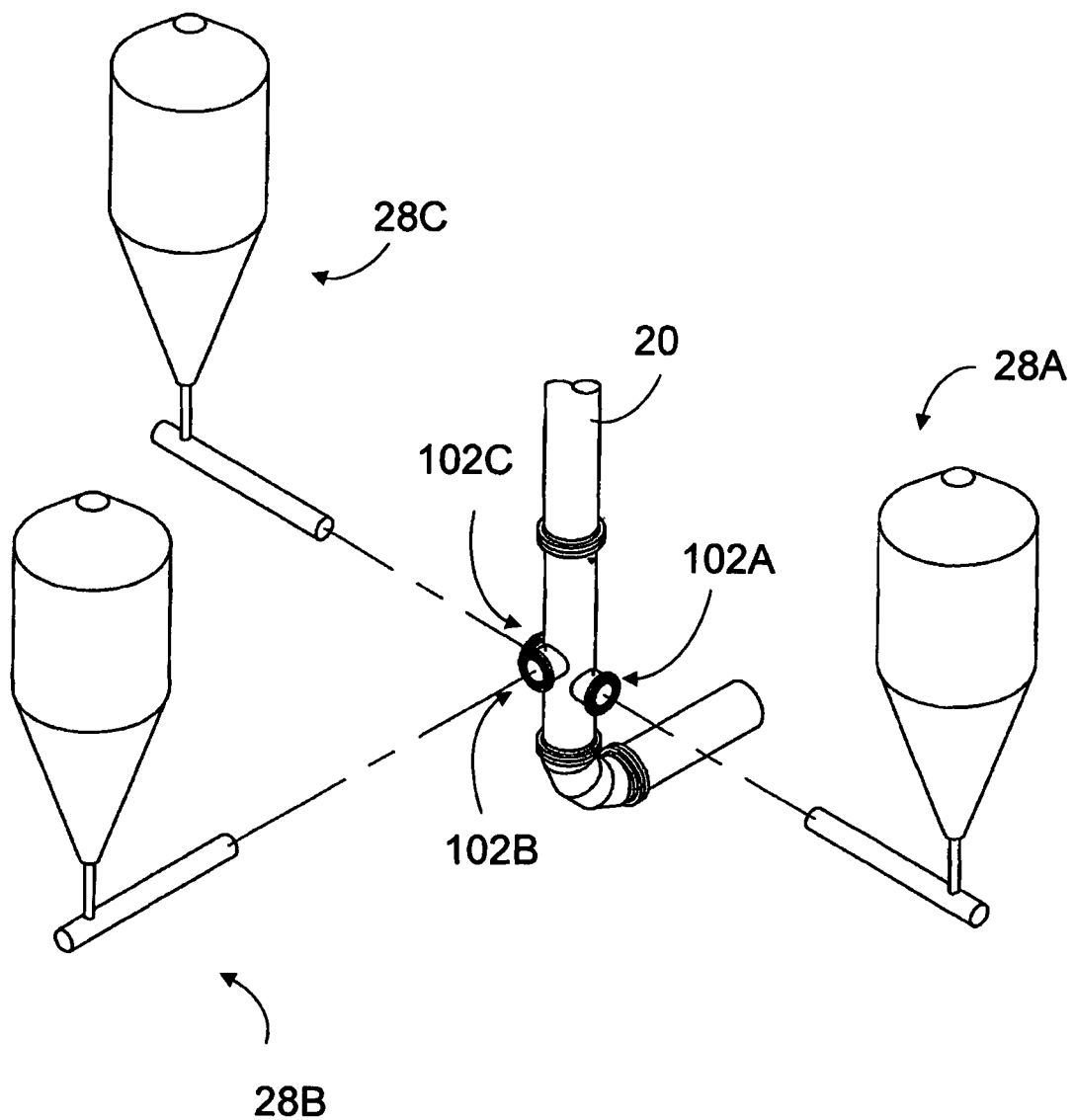
FIG. 6 is a perspective view of a multiple hopper arrangement for an entrained dryer of integrated drying gasification system according to embodiments of the present invention.

With reference to FIG. 6, in preferred embodiments, the system comprises a respective feed point 102A, 102B, 102C to the entrained flow dryer 20 for each lock hopper system 28A, 28B, 28C. The respective feed points 102A, 102B, 102C are provided around a circumference of the entrained flow dryer 20, for example at intervals of 90 degrees. In this embodiment, respective feed points 102A, 102B, 102C are provided at the same level. For the sake of clarity, FIG. 6 only shows the third hopper of each lock hopper system 28A, 28B, 28C. It is envisaged that in some embodiments, two, three or four lock hopper systems 28 can be coupled to a single entrained flow dryer 20. However, in other embodiments, more than four lock hopper systems 28 can be coupled to a single entrained flow dryer 20, for example, by coupling the lock, hopper systems to the single entrained flow dryer 20 at different levels.

At the outlet of the dryer 20, the cooled syngas and dried carbonaceous fuel pass through a number of cyclones (in series and in parallel). The separated dried carbonaceous fuel is then supplied to the feed leg 32 to distribute the carbonaceous fuel into the gasifier 12, as described above.

Reference is now made to the aforementioned problem of disruption of the feed of carbonaceous fuel, such as coal, to the entrained flow dryer 20. According to further aspects of the present invention, to address this problem, at least one intermediate storage vessel 33 is provided in the feed leg 32 to maintain a constant supply of carbonaceous fuel to the gasifier 12. The intermediate storage vessel 33 can supply dried carbonaceous fuel to the gasifier 12 for a temporary period independently of carbonaceous fuel supplied to the entrained flow dryer 20 of the system. According to some embodiments, in the event that the supply of carbonaceous fuel to the entrained flow dryer 20 is disrupted for some reason, the intermediate storage vessel 33 can provide a supply of carbonaceous fuel to the gasifier 12 for a period of between about 10 and about 20 minutes. However, other temporary supply periods are envisaged, which will depend on factors such as the capacity of the intermediate storage vessel 33 and the feed rate to the gasifier 12.

In some embodiments, multiple intermediate storage vessels 33 are provided in the feed leg 32 to increase the time for which a constant supply of carbonaceous fuel can be supplied to the gasifier 12 in the event of a disruption to the supply to the entrained flow dryer 20.

Consequently, disruptions to the feed of carbonaceous fuel to the main dryer 20 will not affect gas production in the gasifier 12, or the control of key parameters, such as fluid bed temperature, whilst the one or more intermediate storage vessels 33 can supply the gasifier 12, thus minimising the effect of any supply disruption on downstream processes.

Hence, according to further aspects of the present invention, there is also provided an improved integrated drying gasification system 100 comprising the gasifier 12 for gasifying carbonaceous fuel to produce hot product gas 14. The system 100 also comprises the feed leg 32 coupled to the gasifier 12 to supply dried carbonaceous fuel to the gasifier 12. The system 100 further comprises at least one intermediate storage vessel 33 in the feed leg 32 to maintain a constant supply of carbonaceous fuel to the gasifier 12 for a temporary period independently of carbonaceous fuel supplied to the entrained flow dryer 20 of the system.

The intermediate storage vessel 33 can be used for oxygen blown or air blown gasification applications. The intermediate storage vessel 33 can be used for systems comprising single or multiple entrained dryers 20.

According to another aspect of the present invention, an improved gasification system includes a gasifier comprising a plurality of feed legs for delivering carbonaceous fuel to the gasifier. In some embodiments, the gasifier is a fluid bed gasifier and the multiple feed legs provide carbonaceous fuel to a fluid bed of the gasification vessel. The feature of multiple feed legs to the gasifier is preferably used in conjunction with the one or more intermediate storage vessels 33 described above. In preferred embodiments, the gasifier comprises three feed legs arranged around the circumference of the gasifier, or around part of the circumference of the gasifier. In some embodiments, multiple feed legs are arranged at intervals of 90 degrees around the circumference of the gasifier 12. However, in other embodiments, multiple feed legs can be arranged at other angles.

In some embodiments, the feed legs are coupled to the gasifier at the same level. In other embodiments, the feed legs can be coupled at different levels of the gasifier.

Viewed from a different perspective, this aspect of the invention can be considered as the feed leg 32 split into a plurality of feed legs, 32a, 32b, 32c etc., to distribute the carbonaceous fuel into the gasifier 12 at a plurality of points. The arrangement can comprise a central feed leg, with the other two feed legs offset 90 degrees either side of the gasifier (i.e. diametrically opposed). The use of multiple feed legs has the advantage of spreading the carbonaceous fuel feed more evenly to the gasifier, which ensures an even gasifier bed temperature. Also, in the event that there is a blockage or other problem with one of the feed legs, the one or more other feed legs can maintain a supply of fuel to the gasifier.

The feed legs 32a, 32b, 32c etc. can either incorporate a screw feeder or a rotary valve with gravity feed to provide flow control.

The gasifier feed point is at a higher pressure than the outlet of the main dryer cyclones (e.g. cyclone 30) as a result of a pressure drop through the gasifier 12, gasifier cyclones 30, hot gas piping, the main dryer 20 and the main dryer cyclones 16.

The dried carbonaceous fuel therefore has to feed against this pressure differential. The feed legs and the dry carbonaceous fuel intermediate storage vessel 33 are designed to ensure that there is sufficient pressure recovery up the feed leg 32 to ensure stable feeding. This is achieved by ensuring that there is sufficient height (or head) of dried carbonaceous fuel in the feed leg 32 and intermediate storage vessel 33.

It will be appreciated that one or more of the aforementioned aspects of the present invention can be incorporated in a single integrated drying gasification system.

International Patent Publication No. WO 93/23500 discloses integrated carbonaceous fuel drying and gasification processes and apparatus, the contents of which are hereby incorporated by reference. This technology is also known as Integrated Drying Gasification Combined Cycle (IDGCC) technology. Embodiments of the present invention described herein are particularly applicable to the processes and apparatus of WO 93/23500 or parts thereof.

However, it will be appreciated that embodiments of the present invention described herein can be used with a variety of other gasification plant including gasification plant which does not use a fluid bed gasifier. For example, the enhanced drying capability can also be applied to entrained flow, transport (or other) gasification technologies. With entrained flow gasifiers, the gasifier outlet temperature is typically between 1,200° C. and 1,600° C. However, the temperature on entry to the drying shaft needs to be controlled to a temperature in the order of 750° C. to 1,050° C. The mass flow exiting the gasifier can be increased by recycling gas or adding steam directly to the gasifier. The temperature of the syngas supplied to the drier shaft can be reduced by mixing recycled gas or steam to the gas flow exiting the gasifier. The relative quantity of gas supplied directly to the gasifier or to the gasifier outlet can be controlled depending upon the moisture content of the carbonaceous fuel being supplied and the required gasifier outlet and main dryer inlet/outlet temperatures. Where embodiments of the present invention are used with entrained flow gasifiers, water can be sprayed directly into the gasifier or at the outlet of the gasifier.

Hence, embodiments of the present invention provide solutions for alleviating the aforementioned problems of the prior art. The increased gas mass flow exiting the gasifier achieved by adding one or more gases from the system, such as recycled syngas, steam and/or recycled carbon dioxide, allows higher moisture content carbonaceous fuels to be supplied to the integrated dryer 20, thus reducing the external drying required and increasing the overall performance of the system.

Providing a plurality of lock hopper systems 28 coupled to the single entrained flow dryer 20 to supply pressurized, pre-dried carbonaceous fuel to the single entrained flow dryer avoids the increased costs and complexity associated with employing multiple entrained flow dryers whilst achieving the desired feed rates of carbonaceous fuel for commercial scale operations.

Providing one or more intermediate storage vessels 33 in the feed leg 32 enables dried carbonaceous fuels to be supplied to the gasifier 12 for a temporary period independently of carbonaceous fuel supplied to the entrained flow dryer 20 of the system. Therefore, disruptions to the feed of carbonaceous fuel to the main dryer 20 will not affect gas production in the gasifier 12, or the control of key parameters, such as fluid bed temperature, thus minimising the effect of any supply disruption on downstream processes.

Splitting the feed leg 32 into a plurality of feed legs enables carbonaceous fuel to be delivered to a fluid bed of the gasification vessel 12 in a distributed manner to ensure an even gasification temperature. The plurality of feed legs also aid in providing sufficient pressure recovery in the feed leg 32 for stable supply of carbonaceous fuel to the gasifier 12.

Throughout the specification the aim has been to describe the preferred embodiments of the invention without limiting the invention to any one embodiment or specific collection of features. It is to be appreciated by those of skill in the art that various modifications and changes can be made in the particular embodiments exemplified without departing from the scope of the present invention.

The invention claimed is:

1. An integrated drying gasification system comprising:
   a gasifier for gasifying carbonaceous fuel to produce hot product gas;
   an entrained flow dryer coupled to the gasifier via a first cyclone located downstream of the entrained flow dryer, wherein the entrained flow dryer receives the hot product gas from the gasifier via a second cyclone located downstream of the gasifier to dry the carbonaceous fuel prior to gasification; and
   at least one inlet to the gasifier to communicate syngas and/or carbon dioxide recycled from the system downstream of the first cyclone to the gasifier to generate an increased hot product gas mass flow rate from the gasifier and an increased drying capacity of the entrained flow dryer.

2. The system of claim 1, wherein the syngas is recycled downstream of a syngas cooler of the system to reduce the temperature of the recycled syngas.

3. The system of claim 1, wherein the syngas is recycled downstream of an ammonia scrubber of the system.

4. The system of claim 1, wherein the syngas is recycled downstream of one or more of the following of the system: a main filter; a water gas shift vessel; an acid gas removal system; a membrane separation system; a pressure swing adsorption system; other syngas processing equipment.

5. The system of claim 1, wherein the system comprises a compressor to increase the pressure of the one or more recycled gases prior to communicating the recycled gases to the gasifier.

6. The system of claim 1, wherein the gasifier is a fluid bed gasifier and the one or more recycled gases are supplied to a fluid bed and/or a freeboard region of the gasifier.

7. The system of claim 1, wherein the one or more recycled gases are supplied to the gasifier via a plurality of nozzles at a variety of levels of the gasifier.

8. The system of claim 1, wherein each recycled gas is supplied to the gasifier via respective separate nozzles for each gas.

9. The system of claim 8, wherein the separate nozzles are also separate from nozzles that supply oxygen to the gasifier.

10. The system of claim 1, wherein steam and/or recycled carbon dioxide is mixed with oxygen prior to supply to the gasifier.

11. The system of claim 1, further comprising
   a plurality of lock hopper systems coupled to the entrained flow dryer to supply pressurized, pre-dried carbonaceous fuel to the entrained flow dryer, wherein each lock hopper system comprises a plurality of lock hoppers.

12. The system of claim 11, further comprising a respective feed point to the entrained flow dryer for each lock hopper system.

13. The system of claim 12, wherein the respective feed points are provided:
   around a circumference of the entrained flow dryer; and/or
   at the same level, or at different levels, of the entrained flow dryer.

14. The system of claim 1, further comprising
a feed leg coupled to the gasifier to supply carbonaceous fuel to the gasifier; and
at least one intermediate storage vessel provided in the feed leg to maintain a constant supply of carbonaceous fuel to the gasifier for a period of between about 10 minutes and about 60 minutes independently of carbonaceous fuel supplied to an entrained flow dryer of the system.

15. The system of claim 14, wherein
the intermediate storage vessel is provided in each feed leg coupled to the gasifier; and/or
each feed leg comprises a screw feeder to provide flow control.

16. The system of claim 1, further comprising a plurality of feed legs coupled to the gasifier for delivering carbonaceous fuel to the gasifier.

17. The system of claim 16, wherein three feed legs are arranged around the circumference of the gasifier.

18. The system of claim 16, wherein the feed legs are arranged at regular intervals around the circumference of the gasifier.

19. The system of claim 16, wherein the feed legs are arranged at intervals of 90 degrees around part of the circumference of the gasifier.

20. The system of claim 16, wherein the feed legs are coupled to the gasifier at the same level, or at different levels.

21. The system of claim 1, wherein the gasifier is an entrained flow gasifier and water is sprayed into the gasifier or at the outlet of the gasifier.

* * * * *